Oct. 14, 1941.  G. F. NADEAU  2,258,997
MANUFACTURE OF PHOTOGRAPHIC FILM
Filed Nov. 26, 1940
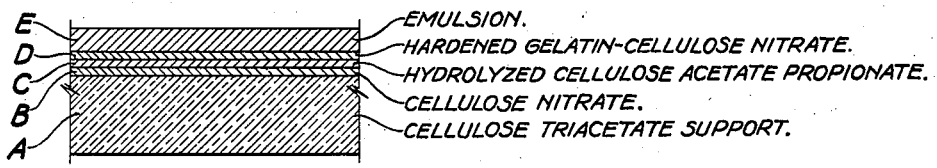
GALE F. NADEAU
INVENTOR Patented Oct. 14, 1941

2,258,997

UNITED STATES PATENT OFFICE 2,258,997

MANUFACTURE OF PHOTOGRAPHIC FILM

Gale F. Nadeau, Rochester, N. Y., assignor to Eastman Kodak Company, Rochester, N. Y., a corporation of New Jersey Application November 26, 1940, Serial No. 367,179

3 Claims. (Cl. 95—9)

This invention relates to photographic materials and more particularly to the production of photographic film having a cellulose triacetate base or support and possessing the degree of flexibility and emulsion adherence requisite for photographic uses.

As is well known, commercial cine and other types of photographic film have largely been manufactured from cellulose nitrate, since this particular cellulose ester has certain physical properties of strength, rigidity, durability and toughness which enable it to withstand relatively severe abrasive, flexing and other influences it must undergo in modern motion-picture apparatus and when employed for other purposes. Cellulose nitrate, however, has certain inherent drawbacks which make it unsuitable for many purposes, chief among which is its relatively high inflammability. With the advent of the amateur moving picture, it was necessary to provide a material which was safe to handle and, if not entirely uninflammable, was nevertheless slow-burning. The answer to this problem was found in the cellulose organic acid esters, particularly cellulose acetate, and more recently in the cellulose mixed organic acid esters such as cellulose acetate propionate and cellulose acetate butyrate, all of which are relatively slow-burning materials and possess other properties which make them particularly adapted for use in cine and other photographic films. However, none of these cellulose organic acid ester materials have measured up to cellulose nitrate in all respects, the latter having been found to possess superior and unique qualities of strength, rigidity, toughness, durability and flexibility.

The cellulose acetate heretofore employed in safety cine film has been of the incompletely esterfied variety, that is, cellulose acetate containing from 41% to 41.5% acetyl. For some time it has been known that the fully esterfied ester, namely, cellulose triacetate, possessed physical properties which were substantially equivalent to those of cellulose nitrate without at the same time having the disadvantages inherent in the latter material. However, cellulose triacetate has been an extremely difficult material to deal with in the manufacture of photographic film support for the reason, among others, that none of the ordinary cellulose ester solvents such as acetone, methyl alcohol, ethyl alcohol, ethylene chloride and other liquids are solvents for the tri-ester. Methylene chloride, a highly volatile and relatively expensive material has been found to be about the only practical solvent for this ester, but its use has been found to involve many difficulties in casting the film, recovery of the solvent due to its extreme volatility, and the like. Nevertheless, films have been made from cellulose triacetate and have proved to be highly satisfactory and, as previously stated, not only equivalent, but even superior to cellulose nitrate as film support, particularly cine support. However, due to the extreme insolubility of cellulose triacetate in ordinary solvents, it has been extremely difficult if not impossible, to prepare this type of film for the application of a photographic emulsion because of the problems involved in subbing, that is, preparing the film and thereby giving it the proper flexibility and brittleness characteristics.

As is well known, it is always a difficult problem to attach the photographically sensitive gelatin layer to the film base and still preserve both the requisite degree of flexibility and emulsion adherence. If the sensitized emulsion is caused to adhere to the film support too strongly, or in fact, if any layer deposited on the film is caused to adhere too strongly, the film becomes brittle and subject to rupture under only a slight amount of flexing. On the other hand, if the degree of adherence of the emulsion or any of the underlying layers between the emulsion and the film support is lowered, excessive stripping of the emulsion from the support will occur, that is, the emulsion will tend to loosen and break away from the support. This separation of the emulsion or other layers may extend for a considerable distance longitudinally of the film. It will thus be seen that it is always necessary to work out a compromise between emulsion adherence and and flexibility (brittleness). This is always an extremely delicate matter and each particular film support has to be dealt with on its own merits and on the basis of the particular uses to which it is ultimately to be put in practice.

The present problem, the solution of which is provided by the instant invention, derives from the use of cellulose triacetate as a film support material. This invention has as its principal object to provide a means of employing cellulose triacetate as a photographic film support. A further object is to provide a method whereby this type of film support can be satisfactorily subbed and prepared for the application of a photographically sensitive colloid layer to produce a finished film which will have satisfactory flexibility, i. e., will be sufficiently free from brittleness, to enable it to be processed and used as commercial cine film and for other purposes. Other objects will appear hereinafter.

These objects are accomplished by the following invention which, in its broader aspects, comprises the application to a cellulose triacetate film support of a cellulose nitrate layer, applying over the cellulose nitrate layer a layer of hydrolyzed cellulose mixed organic acid ester such as hydrolyzed cellulose acetate propionate, applying over the hydrolyzed layer a layer composed of gelatin mixed with a small amount of cellulose nitrate and thereafter applying over the last mentioned layer the sensitive colloid layer.

In the following examples and description I have set forth several of the preferred embodiments of my invention, but they are to be regarded merely as illustrations and not as a limitation thereof.

In the single figure of the accompanying drawing there is illustrated in greatly exaggerated scale a cross-section of a typical photographic film produced in accordance with my invention.

In carrying out extensive research on the problem of suitably preparing a cellulose triacetate film support for the application of the sensitized emulsion, it was found that the material could not be dealt with on the same basis as with other photographic film support, primarily because of the fact that the ordinary solvents do not attack the cellulose triacetate surface and therefore it was impossible properly to secure the sub-layer to the support by penetration of the solvent medium into the material of the support. In the course of my study of this problem I have determined that a material must be employed which possesses a certain amount of chemical unsaturation within its molecule, that is, a material which will have a natural affinity for cellulose triacetate. As will be readily appreciated, in the cellulose triacetate aggregate there are no free hydroxyl groups, all esterifiable hydroxyl groups of the glucose unit having been esterified by the acetyl radical, thus producing a completely esterified compound which is highly resistant to the wetting or penetrating action of ordinary solvents.

Notwithstanding these difficulties, I have found that if one employs a solution of cellulose nitrate dissolved in an appropriate solvent or solvent mixture, such as a mixture of methyl alcohol and acetone, a thin layer of the nitrate may be adhesively attached to the cellulose triacetate surface. This attachment takes place, not by any penetrative action of the solvent but merely by virtue of the chemical attraction existing between the cellulose nitrate and the cellulose triacetate. Thus, the nitrate is joined to the cellulose triacetate by the action of chemical or adhesive forces analogous to those existing between a resinous or other priming coat deposited on a metal surface prior to the application of a lacquer or when an adhesive is applied to a glass surface.

Assuming the cellulose triacetate support to have been satisfactorily subbed with a thin layer of cellulose nitrate in the manner just specified, there is still the problem of adhesively joining the sensitized gelatin layer to the subbed material to obtain a film of satisfactory flexibility and freedom from brittleness. I have found that if the cellulose nitrate layer is subbed with a solution of a hydrolyzed cellulose organic acid ester, the layer of the material deposited after evaporation of solvents will be of such nature that, not only will it be permanently and adhesively joined to the underlying cellulose nitrate layer, but will also be of such nature as will permit of the application of the necessary gelatin sub to provide the proper surface for application of the final emulsion layer.

The gelatin sub is preferably a mixture of gelatin and cellulose nitrate, the nitrate being present in a small amount, but sufficient to increase the affinity of the gelatin sub for the cellulose organic acid ester underlying it. It might be said in this connection that the cellulose organic acid ester material of the underlying layer is hydrolyzed for the purpose of making it more compatible with the gel sub which is superimposed thereon. The sensitized gelatin layer can then be readily deposited on the gel sub surface and a satisfactory film produced.

It will be seen from the above discussion that a number of extremely delicate problems are presented in the manufacture of a practical photographic film if one employs a cellulose triacetate support and it is only by means of the specific combination of layers above set forth that a satisfactory product can be produced.

My invention will be more fully illustrated by reference to several typical examples describing the subbing and emulsion-coating of cellulose triacetate film support.

*Example 1*

A cellulose triacetate film support of .005 inch in thickness is subbed by applying thereto a solution of an alcohol-soluble cellulose nitrate having the following composition

|  | Per cent by weight |
|---|---|
| Cellulose nitrate | 3 |
| Acetone | 22 |
| Methanol | 75 |

Upon evaporation of solvent an extremely thin layer or sub of the cellulose nitrate is deposited on the support material, and adhesively and permanently attached thereto. Over this nitrate layer is applied a second sub composed of a hydrolyzed cellulose acetate propionate, the subbing solution in this case having the following composition.

|  | Per cent by weight |
|---|---|
| Hydrolyzed cellulose acetate propionate (6-18% and preferably 10-12% acetyl) | 2 |
| Ethylene chloride | 10 |
| Acetone | 35 |
| Monomethyl ether of ethylene glycol | 25 |
| Methanol | 28 |

After evaporation of solvents the hydrolyzed cellulose acetate propionate surface is then subbed with a layer of gelatin which is deposited from a solution of the following composition:

|  | Percent by weight |
|---|---|
| Gelatin | 1 |
| Cellulose nitrate (alcohol-soluble) | 0.2 |
| Acetone | 50 |
| Water | 8 |
| Methyl alcohol | 38.8 |
| Acetic Acid | 2.0 |

The cellulose nitrate content of the solution may range from .1% to .4% while the solution may also contain 1-5%, based on the weight of the gelatin, of a gelatin hardener such as chromic chloride, for example. After the gel subbing operation has been completed in accordance with standard practice, a sensitive gelatino-silver halide cine-positive emulsion is applied to the subbed surface of the film, and subjected to the usual stripping and brittleness tests. The film produced in the manner just illustrated shows satisfactory dry and wet stripping and satisfactory flexibility (brittleness), thus indicating that the film is completely satisfactory for photographic purposes.

Example 2

A cellulose triacetate cine support was subbed as in Example 1 with cellulose nitrate. Following the application of the nitrate sub there was applied thereover a hydrolyzed cellulose acetate butyrate sub from a subbing solution having the following composition

| | Percent by weight |
|---|---|
| Hydrolyzed cellulose acetate butyrate (10-12% butyryl) | 2 |
| Ethylene chloride | 10 |
| Acetone | 35 |
| Monomethyl ether of ethylene glycol | 25 |
| Methanol | 28 |

A hardened gelatin sub was applied over the cellulose acetate butyrate as in Example 1, followed by application of a gelatino-silver-halide emulsion. This film was then subjected to the flexibility (brittleness) and dry and wet stripping tests and was found to be satisfactory in all respects.

The subbing operation per se may be carried out in any convenient manner, preferably by means of an applicator roll dipping in the subbing solution and then continuously brought in contact with the film surface. Other equivalent means of subbing the support well known to those skilled in the art may be employed, if desired.

As will be understood, many changes may be made in the above formulae and in the technique of applictaion of the subs within the scope of my invention. However, in each instance, I employ a fully esterified cellulose acetate (cellulose triacetate) support, a cellulose nitrate sub, a hydrolyzed celluose organic acid ester sub, and a hardened gelatin sub in the order named, since, only by this specific combination of layers can the best results be obtained and a commercially satisfactory photographic film be produced. If it is desired to employ cellulose acetate as the hydrolyzed layer between the nitrate and the hardened gelatin sub, a cellulose acetate of about 70% precipitation value and containing about 38% acetyl may be deposited from a 3% solution of 70% acetone and 30% methyl alcohol.

As is understood by those skilled in the art the term "sub" refers to layers of extremely minute thickness deposited on the surface of the film support. For cine types of film having a thickness of the order of .005 inch, each of the subs, with the exception of the gel sub, may have a thickness of about 1 to 3% of the thickeness of the support itself, that is, of the order of .00005 inch. The thickness of the gel sub is even more minute, but of the order of about 10% of the thickness of the other subs.

As indicated above, the photographic films of my invention are found to fully meet the requirements of commercial use and to respond successfully to the standard flexibility (brittleness), wet and dry stripping and the so-called "heater-after" tests. These tests will now be described as follows:

The dry stripping test is carried out as follows: A piece of the complete emulsion-coated film of a convenient size, say, 6 inches wide by 40 inches long, is held at one end with both hands with the emulsion side toward the operator and is then torn lengthwise with successive quick motions of one hand, the tearing generally being carried out at a slight angle to the edge of the strip in order to obtain an oblique tear. The tears thus produced are more or less jagged. An attempt is now made to pull back the emulsion coating from the film with the fingernails and the degree to which the emulsion separates from the support is a measure of its adherence. It will, of course, be understood that the standards of emulsion adherence will vary for different types of film and what is considered satisfactory for one film may not be satisfactory for another. For example, stripping (emulsion adherence) is said to be satisfactory of X-ray film if the emulsion cannot be stripped back more than one or two inches. For cine film, on the other hand, there should be practically no stripping.

The wet stripping test is carried out as follows: A strip of the emulsion-coated film of convenient size is soaked in water at 70° F. for ten minutes. It is then removed from the water and fixed on a flat surface with the emulsion side up. The emulsion is then gouged or creased with the fingernails at points near the middle and end of the strip, each nail scratch tearing the emulsion away from the support to a certain extent. The scratched places are then rubbed with considerable force with the balls of the fingertips for several seconds. A film is said to have satisfactory wet stripping (emulsion adherence) properties when no peeling, or substantially no peeling, of the emulsion occurs as a result of this rubbing action. Wet stripping is said to be unsatisfactory when an appreciable or large amount of the emulsion comes off. For most types of film it should not be possible, to remove pieces wider than ¼ inch by this test.

The brittleness test is carried out as follows: A strip of film of convenient size is heated for forty-five minutes in a brittleness oven in which air having a controlled relative humidity of 20-25% and a temperature of 110-120° F. is circulated. The film is then removed from the oven and folded at ten different places along the strip by pressing the fold suddenly between the forefinger and the thumb. If the film is brittle, this sudden folding will cause it to break or snap in two at the fold. The flexibility may be defined in terms of freedom from brittleness which may be figured directly in percentages from the results of the test. For example, a film is said to be 60% free from brittleness if it ruptures at only four out of ten folds.

The "heater-after" test is carried out simply by running the finished film, after processing in the photographic developing baths usually employed and subsequently drying the film and then subjecting it to the same steps as are employed in the dry stripping test. A film is said to have satisfactory "heater-after" stripping if it responds in the same manner as does a film which has a satisfactory dry stripping test.

My invention will be further understood by reference to the single figure of the drawing in which A designates a cellulose triacetate film support, B a cellulose nitrate sub adhesively joined to the support, C a hydrolyzed cellulose acetate propionate layer adhesively joined to the cellulose nitrate layer, D a hardened gelatin-cellulose nitrate layer, and E is the sensitive gelatino-silver-halide emulsion.

What I claim and desire to secure by Letters Patent of the United States is:

1. A photographic film of satisfactory flexibility and free from brittleness which comprises a cellulose triacetate support and a photographically sensitive colloid layer joined to the support by a composite intervening layer comprising a cellulose nitrate sub adhesively joined to the support, a hydrolyzed cellulose mixed organic acid ester sub adhesively joined to the cellulose nitrate sub and a mixed gelatin cellulose nitrate sub adhesively joined to the cellulose mixed organic acid ester sub, said intervening layer rendering the flexibility characteristics of the film as a whole independent of the degree of adherence existing between the photographically sensitive layer and the subbed support.

2. A photographic film of satisfactory flexibility and free from brittleness which comprises a cellulose triacetate support and a photographically sensitive colloid layer joined to the support by a composite intervening layer comprising a cellulose nitrate sub adhesively joined to the support, a hydrolyzed cellulose acetate propionate sub adhesively joined to the cellulose nitrate sub and a mixed gelatin cellulose nitrate sub adhesively joined to the hydrolyzed cellulose acetate propionate sub, said intervening layer rendering the flexibility characteristics of the film as a whole independent of the degree of adherence existing between the photographically sensitive layer and the subbed support.

3. A photographic film of satisfactory flexibility and free from brittleness which comprises a cellulose triacetate support and a photographically sensitive colloid layer joined to the support by a composite intervening layer comprising a cellulose nitrate sub adhesively joined to the support, a hydrolyzed cellulose acetate butyrate sub adhesively joined to the cellulose nitrate sub and a mixed gelatin cellulose nitrate sub adhesively joined to the hydrolyzed cellulose acetate butyrate sub, said intervening layer rendering the flexibility characteristics of the film as a whole independent of the degree of adherence existing between the photographically sensitive layer and the subbed support.

GALE F. NADEAU.